(12) United States Patent
Filiol et al.

(10) Patent No.: US 10,960,709 B2
(45) Date of Patent: Mar. 30, 2021

(54) AIRPLANE TIRE HAVING A CASING REINFORCEMENT WITH IMPROVED ENDURANCE

(71) Applicant: COMPAGNIE GENERALE DES ETABLISSEMENTS MICHELIN, Clermont-Ferrand (FR)

(72) Inventors: Eve-Anne Filiol, Clermont-Ferrand (FR); Fabien Mejean, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 244 days.

(21) Appl. No.: 16/096,315

(22) PCT Filed: Feb. 17, 2017

(86) PCT No.: PCT/FR2017/050366
§ 371 (c)(1),
(2) Date: Oct. 25, 2018

(87) PCT Pub. No.: WO2017/187032
PCT Pub. Date: Nov. 2, 2017

(65) Prior Publication Data
US 2019/0135039 A1    May 9, 2019

(30) Foreign Application Priority Data
Apr. 25, 2016    (FR) ...................................... 16 53620

(51) Int. Cl.
*B60C 9/08* (2006.01)
*D02G 3/48* (2006.01)
(Continued)

(52) U.S. Cl.
CPC .............. *B60C 9/0042* (2013.01); *B60C 9/08* (2013.01); *D07B 1/02* (2013.01);
(Continued)

(58) Field of Classification Search
CPC .......... B60C 9/0042; B60C 2009/0416; B60C 2009/0425; B60C 2009/0433;
(Continued)

(56) References Cited

U.S. PATENT DOCUMENTS 2,595,069 A    4/1952  Fritz
3,610,311 A *  10/1971 Simons .................... D02G 3/48
                                                        152/451

(Continued)

FOREIGN PATENT DOCUMENTS

EP    0174147 A1    3/1986
EP    0295348 A1    12/1988
(Continued)

OTHER PUBLICATIONS

International Search Report dated May 10, 2017, in corresponding PCT/FR2017/050366 (6 pages).

*Primary Examiner* — Justin R Fischer
(74) *Attorney, Agent, or Firm* — Venable LLP (57) ABSTRACT

A radial aircraft tire (1), defined in three main directions, circumferential (X), axial (Y) and radial (Z), comprises a crown (2) surmounted by a tread (3), two sidewalls (4), two beads (5), each sidewall (4) connecting each bead (5) to the crown (2), a carcass reinforcement (7) that is anchored in each of the beads (5) at at least one bead wire (6) and extends in the sidewalls (4) as far as the crown (2), a crown reinforcement or belt (10) that extends in the crown (2) in the circumferential direction (X) and is situated radially between the carcass reinforcement (7) and the tread (3), said carcass reinforcement (7) having at least one ply referred to
(Continued)

as carcass ply in the form of a rubber matrix reinforced with radially oriented reinforcing elements, referred to as radial textile reinforcers, the latter being constituted entirely or partially by textile plied yarns of nylon comprising N multifilament strands twisted together to form a helix, characterized in that: N is greater than 2; the count of each strand is greater than 180 tex; the tenacity of each strand is greater than 75 cN/tex; the elongation at break of each strand is greater than 14%; the tenacity of each plied yarn is greater than 60 cN/tex; the elongation at break of each plied yarn is greater than 18%; and the helix angle of each plied yarn is greater than 20°.

28 Claims, 3 Drawing Sheets

(51) Int. Cl.
  *B60C 9/00* (2006.01)
  *D07B 1/02* (2006.01)
  *B60C 9/04* (2006.01)
  *B60C 9/02* (2006.01)

(52) U.S. Cl.
  CPC ............. *B60C 2009/0085* (2013.01); *B60C 2009/0092* (2013.01); *B60C 2009/0276* (2013.01); *B60C 2009/045* (2013.01); *B60C 2009/0425* (2013.01); *B60C 2009/0441* (2013.01); *B60C 2009/0458* (2013.01); *B60C 2009/0475* (2013.01); *B60C 2200/02* (2013.01); *D07B 2205/2046* (2013.01); *D07B 2501/2046* (2013.01)

(58) Field of Classification Search
  CPC ...... B60C 2009/045; B60C 2009/0458; B60C 2009/0475; D02G 3/48
  See application file for complete search history.

(56) References Cited

U.S. PATENT DOCUMENTS

| | | | |
|---|---|---|---|
| 4,155,394 A * | 5/1979 | Shepherd | B60C 9/0042 152/527 |
| 4,807,681 A | 2/1989 | Kadota | |
| 4,887,655 A | 12/1989 | Imai et al. | |
| 4,902,774 A | 2/1990 | Yang et al. | |
| 4,934,428 A | 6/1990 | Aoki et al. | |
| 4,947,914 A | 8/1990 | Noma et al. | |
| 4,966,214 A | 10/1990 | Kadota | |
| 5,176,769 A | 1/1993 | Kadota et al. | |
| 5,769,982 A | 6/1998 | De Loze De Plaisanc | |
| 6,093,490 A | 7/2000 | Meraldi et al. | |
| 6,261,689 B1 | 7/2001 | Meraldi et al. | |
| 7,484,545 B2 | 2/2009 | Westgate et al. | |
| 8,210,223 B2 | 7/2012 | Westgate et al. | |
| 8,752,602 B2 | 6/2014 | Itami | |
| 9,840,644 B2 | 12/2017 | Doisneau et al. | |
| 10,005,929 B2 | 6/2018 | Doisneau et al. | |
| 10,040,976 B2 | 8/2018 | Doisneau et al. | |
| 2007/0137754 A1 | 6/2007 | Westgate et al. | |
| 2010/0024948 A1 | 2/2010 | Westgate et al. | |
| 2010/0252165 A1 | 10/2010 | Yano et al. | |
| 2012/0186218 A1 | 7/2012 | Westgate et al. | |
| 2014/0235124 A1 | 8/2014 | Doisneau et al. | |
| 2014/0235125 A1 | 8/2014 | Doisneau et al. | |
| 2014/0308864 A1 | 10/2014 | Doisneau et al. | |
| 2016/0207357 A1 | 7/2016 | Andre | |
| 2016/0251550 A1 | 9/2016 | Michoud et al. | |
| 2018/0118983 A1 | 5/2018 | Doisneau et al. | |

FOREIGN PATENT DOCUMENTS

| | | | |
|---|---|---|---|
| EP | 0364291 A1 | | 4/1990 |
| EP | 0 396 494 A2 | | 11/1990 |
| EP | 0756950 A1 | | 2/1997 |
| EP | 0848767 A1 | | 6/1998 |
| EP | 1 800 901 A2 | | 6/2007 |
| EP | 1808313 A2 | | 7/2007 |
| FR | 2624063 A1 | | 6/1989 |
| FR | 2628035 A1 | | 9/1989 |
| FR | 2632252 A1 | | 12/1989 |
| GB | 2218676 A | | 11/1989 |
| GB | 1016539 | * | 1/1996 |
| WO | 2013/017421 A1 | | 2/2013 |
| WO | 2013/017422 A1 | | 2/2013 |
| WO | 2013/017423 A1 | | 2/2013 |
| WO | 2015/007641 A1 | | 1/2015 |
| WO | 2015/007642 A1 | | 1/2015 |
| WO | 2015039987 A1 | | 3/2015 |

* cited by examiner

AIRPLANE TIRE HAVING A CASING REINFORCEMENT WITH IMPROVED ENDURANCE

FIELD OF THE INVENTION

The field of the present invention is that of aircraft tyres having a radial carcass reinforcement that are intended, in a known manner, to be inflated to relatively high pressures and to support very heavy loads at high speed.

It relates more particularly to the textile reinforcing elements or "reinforcers" used in the carcass reinforcements of such tyres.

PRIOR ART

Textile has been used as a tyre reinforcer since the very beginning.

As is known, textile reinforcers, produced from continuous textile fibres such as nylon fibres, play an important part in tyres, in particular in aircraft tyres. In order to meet the requirements of these tyres, they have to have high mechanical strength, good endurance and finally excellent adhesion to the rubber matrices that they are capable of reinforcing.

That reminder having been given, the radial carcass reinforcements of aircraft tyres generally comprise several textile plies, which are anchored in each bead at at least one bead wire or annular reinforcing element. The textile reinforcers of these reinforcements and plies are wound around the bead wire, forming turn-ups, the respective ends of which are spaced apart radially from the axis of rotation of the tyre. The harsh conditions under which the aircraft tyres are used are such that very high endurance of these carcass reinforcements is necessary.

As is described notably in the patent document EP 0 756 950, a notable improvement in endurance has been obtained in the past by the textile plies of the carcass reinforcement being separated into two groups: the first group comprises the axially inner plies of the carcass reinforcement in the region of the sidewalls and beads, said plies then being wound around an anchoring bead wire in each bead passing from the inside of the tyre to the outside; the second group is made up of axially outer plies in the above region, these plies generally being wound partially around the bead wire, passing from the outside of the tyre to the inside.

Each carcass reinforcement ply is for its part reinforced by unidirectional textile reinforcers in the form of "cords" or "plied yarns" (the two terms being synonymous), frequently made of aliphatic polyamide or nylon, each cord being made up of several strands twisted together to form a helix. In order for it to be possible to reinforce these plies effectively, the mechanical properties in tension (in particular the breaking strength and tenacity) and the fatigue strength (endurance in tension, bending, compression) of these cords is of key importance; generally, for a given material, the greater the linear densities (counts) and the twists of the cords, the higher these mechanical properties and fatigue strength are.

In order to illustrate the prior art relating to the radial carcass reinforcements of aircraft tyres and the textile reinforcers thereof, the patents or patent applications EP 174 147, 295 348, 364 291, EP 1 808 313, FR 2 624 063, FR 2 628 035, FR 2 632 252, U.S. Pat. Nos. 4,887,655, 8,752,602 will also be cited.

Nowadays, the manufacturers of aircraft tyres are continually seeking solutions for further improving the endurance of carcass reinforcements in order to increase the service life of the tyres or, given an identical lifetime, to reduce the weight of these reinforcements and thus of the tyres.

During the course of their research, the Applicants have specifically found a specific design of textile cord of nylon that has made it possible to improve the fatigue strength of these reinforcers in these reinforcements and thus to meet the above objective.

BRIEF DESCRIPTION OF THE INVENTION

Figure 1:
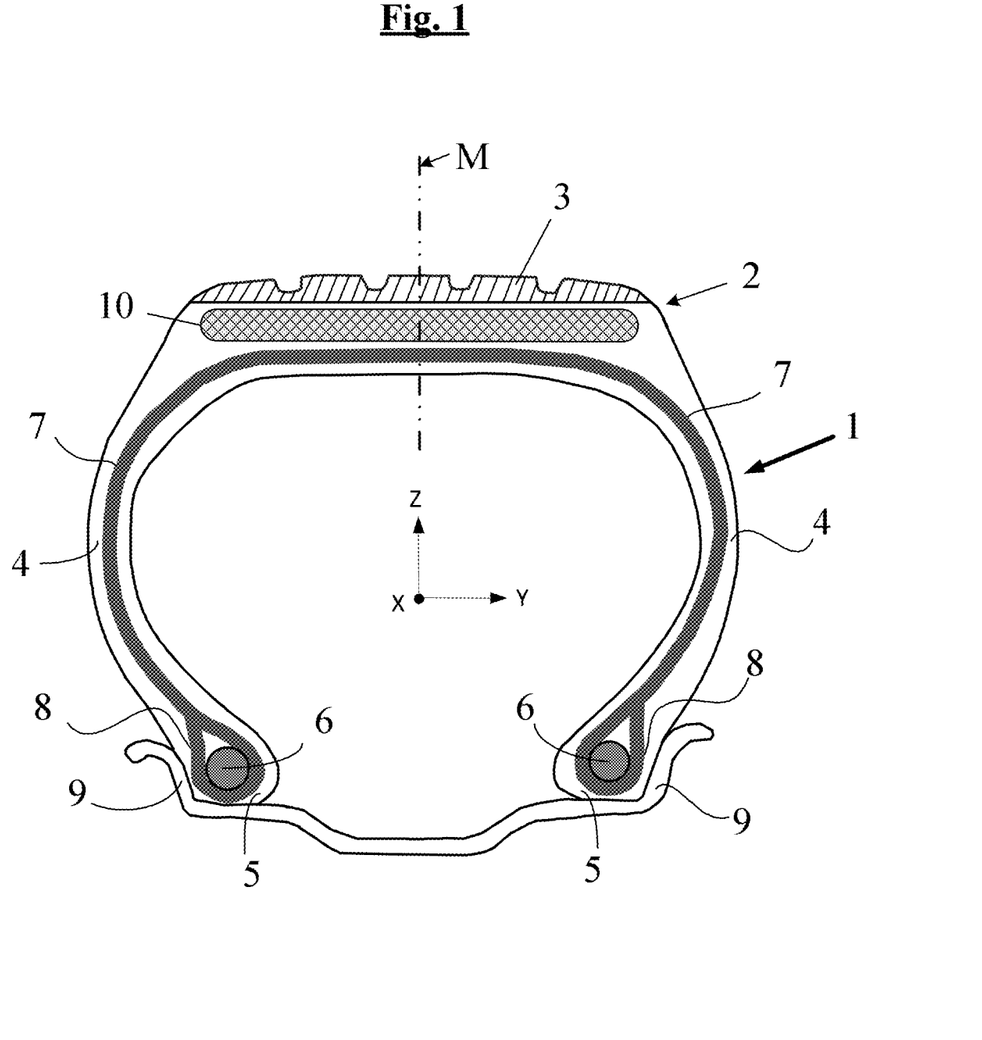
Figure 2:
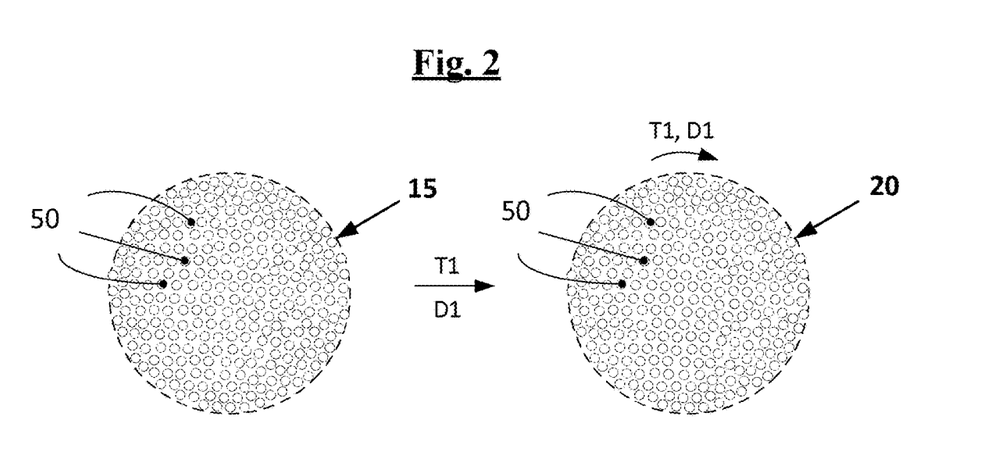
Figure 3:
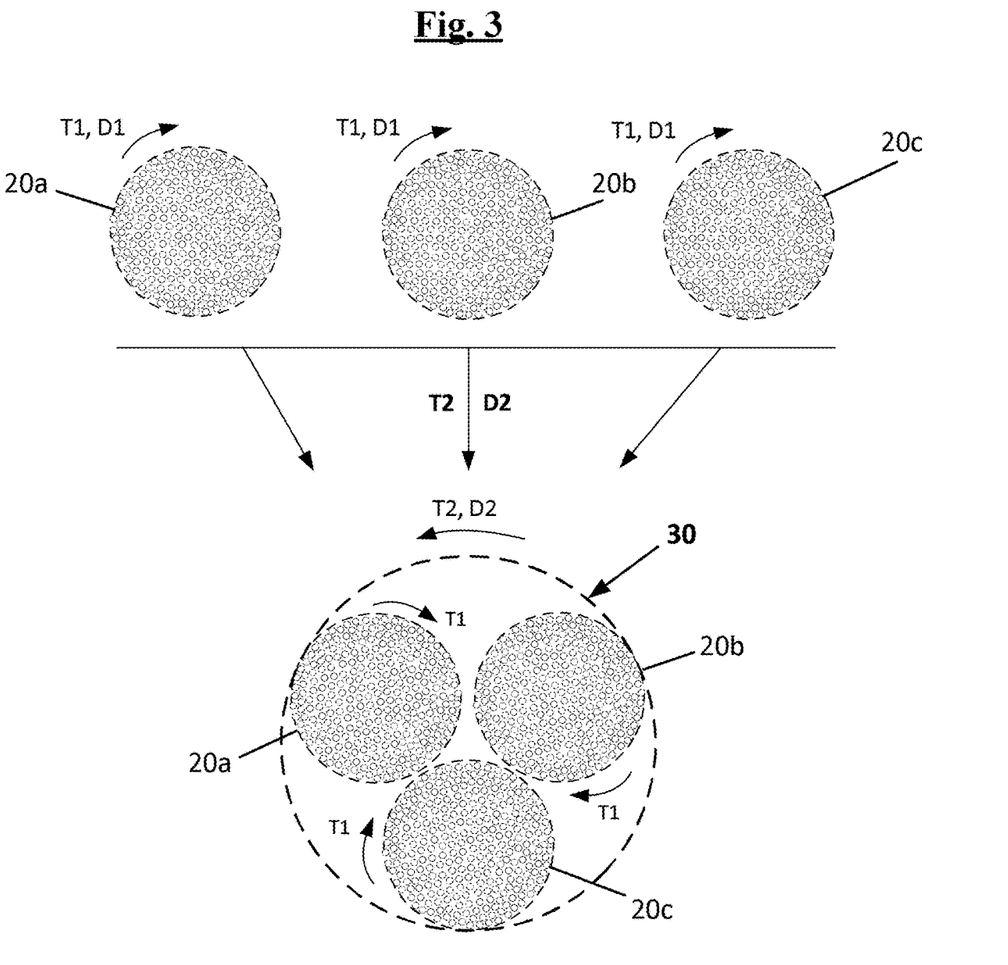

Thus, a first subject of the present invention relates (according to the references given in the appended FIGS. 1 to 3) to a radial aircraft tyre (1), defining three main directions, circumferential (X), axial (Y) and radial (Z), comprising a crown (2) surmounted by a tread (3), two sidewalls (4), two beads (5), each sidewall (4) connecting each bead (5) to the crown (2), a carcass reinforcement (7) that is anchored in each of the beads (5) at at least one bead wire (6) and extends in the sidewalls (4) as far as the crown (2), a crown reinforcement or belt (10) that extends in the crown (2) in the circumferential direction (X) and is situated radially between the carcass reinforcement (7) and the tread (3), this carcass reinforcement (7) referred to as radial carcass reinforcement having at least one ply referred to as carcass ply in the form of a rubber matrix reinforced with radially oriented reinforcing elements, referred to as radial textile reinforcers, the latter being constituted entirely or partially by textile plied yarns (30) of nylon comprising N multifilament strands (20a, 20b, 20c) twisted together to form a helix, characterized in that:

- N is greater than 2;
- the count denoted Ti of each strand is greater than 180 tex;
- the tenacity denoted $Te_1$ of each strand is greater than 75 cN/tex;
- the elongation at break denoted $Ar_1$ of each strand is greater than 14%;
- the tenacity denoted $Te_2$ of each plied yarn is greater than 60 cN/tex;
- the elongation at break denoted $Ar_2$ of each plied yarn is greater than 18%;
- the helix angle denoted $\alpha$ of each plied yarn is greater than 20°.

The invention also relates to the use, for reinforcing a carcass reinforcement of a radial aircraft tyre, of a textile plied yarn of nylon as defined above.

BRIEF DESCRIPTION OF THE FIGURES

The invention and its advantages will be readily understood in the light of the following detailed description and exemplary embodiments, and also FIGS. 1 to 4 relating to these embodiments, which schematically show (unless otherwise indicated, not to a specific scale):

- in radial section (i.e. in a plane containing the axis of rotation of the tyre), an example of an aircraft tyre (1) according to the invention, incorporating within its radial carcass reinforcement (7) a textile plied yarn of nylon according to the invention (FIG. 1);
- in cross section, a conventional multifilament textile fibre (or spun yarn), first of all in the initial state (15), i.e. not twisted, and then after a first twisting operation T1 in the direction D1, in the form of a spun yarn pre-twisted on itself or "strand" (20) (FIG. 2);
- in cross section, the assembly of 3 strands (20a, 20b, 20c) as above (all pre-twisted beforehand by being twisted T1 in the direction D1), which are twisted together by a second twisting operation T2 in the direction D2 opposite to the direction D1, in order to form a final cord or textile plied yarn (30) that is able to be in accordance with the invention (FIG. 3);

in cross section, another depiction of a final textile cord (40), less schematic than the previous depiction, illustrating the fact that the final section of a textile cord (made in this case, for example, of 4 strands), once formed and under minimum tension, actually comes closer to a section with a circular contour on account of the high lateral plasticity provided by the multifilament nature of the starting material (FIG. 4).

DEFINITIONS

In the present application, terms are understood as follows:

"rubber" or "elastomer" (the two terms being considered to be synonymous): any type of elastomer, be it of the diene type or the non-diene type, for example thermoplastic;

"rubber composition" or "rubbery composition": a composition which contains at least one rubber and one filler;

"layer": a sheet, band or any other element of which the thickness is relatively small compared to its other dimensions, preferably in which the ratio of thickness to the largest of the other dimensions is less than 0.5, more preferably less than 0.1;

"axial direction": a direction substantially parallel to the axis of rotation of the tyre;

"circumferential direction": a direction which is substantially perpendicular both to the axial direction and to a radius of the tyre (in other words, tangential to a circle of which the centre lies on the axis of rotation of the tyre);

"radial direction": a direction along a radius of the tyre, that is to say any direction that passes through the axis of rotation of the tyre and is substantially perpendicular to this direction, that is to say makes an angle of no more than 5 degrees (i.e. zero or at most equal to 5 degrees) with a perpendicular to this direction;

"oriented along an axis or in a direction": when speaking of any element such as a reinforcer, an element which is oriented substantially parallel to this axis or this direction, that is to say makes an angle of no more than 5 degrees with this axis or this direction;

"oriented perpendicularly to an axis or a direction": when speaking of any element such as a reinforcer, an element which is oriented substantially perpendicularly to this axis or this direction, that is to say makes an angle of no more than 5 degrees with a perpendicular to this axis or this direction;

"median circumferential plane" (denoted M): the plane perpendicular to the axis Y of rotation of the tyre which is situated mid-way between the two beads and passes through the middle of the crown reinforcement or belt;

"unidirectional reinforcers": reinforcers that are essentially mutually parallel, that is to say oriented along one and the same axis.

Moreover, unless expressly indicated otherwise, all the percentages (%) shown are % by weight.

The expression "x and/or y" means "x" or "y" or both (i.e. "x and y"). Any range of values denoted by the expression "between a and b" represents the field of values ranging from more than "a" to less than "b" (that is to say limits "a" and "b" excluded), whereas any range of values denoted by the expression "from a to b" means the field of values ranging from "a" up to "b" (that is to say including the strict limits "a" and "b").

DETAILED DESCRIPTION AND EXEMPLARY EMBODIMENTS OF THE INVENTION

By way of example, FIG. 1 very schematically shows (that is to say without being drawn to any particular scale) a radial section through an aircraft tyre (1), the radial carcass reinforcement (7) of which is reinforced by textile plied yarns of nylon according to the invention.

This radial aircraft tyre (1), defining three main directions, circumferential (X), axial (Y) and radial (Z), comprises a crown (2) surmounted by a tread (3), two sidewalls (4), two beads (5), each sidewall (4) connecting each bead (5) to the crown (2), a carcass reinforcement (7) that is anchored in each of the beads (5) at at least one bead wire (6) and extends in the sidewalls (4) as far as the crown (2), a crown reinforcement or belt (10) that extends in the crown (2) in the circumferential direction (X) and is situated radially between the carcass reinforcement (7) and the tread (3). The carcass reinforcement (7) referred to as radial carcass reinforcement has at least one ply referred to as "carcass ply" in the form of a rubber matrix or composition reinforced with substantially radially oriented reinforcing elements, referred to as radial textile reinforcers, at least some of which are made up of specific textile reinforders of nylon. Preferably, the latter make up all of the radial textile reinforcers that are used in said carcass ply (7).

In accordance with the invention, these textile plied yarns of nylon, comprising a number N of multifilament strands twisted together to form a helix, combine the following features:

N is greater than 2;

the count denoted Ti of each strand is greater than 180 tex;

the tenacity denoted $Te_1$ of each strand is greater than 75 cN/tex;

the elongation at break denoted $Ar_1$ of each strand is greater than 14%;

the tenacity denoted $Te_2$ of each plied yarn is greater than 60 cN/tex;

the elongation at break denoted $Ar_2$ of each plied yarn is greater than 18%;

the helix angle denoted α (alpha) of each plied yarn is greater than 20°.

Preferably, nylon or aliphatic polyamide (as a reminder, the two terms are synonymous) is chosen from the polyamides 4-6, 6, 6-6, 11 or 12; a nylon 6 or 6-6 is more preferably used, more particularly a nylon 6-6.

The specific plied yarn or cord of nylon that is used to reinforce the carcass plies of the aircraft tyre according to the invention therefore has the first essential feature of comprising more than two strands, i.e. three or more than three strands.

Preferably, N is equal to 3 or to 4. Even more preferably, N is equal to 3.

FIG. 2 schematically shows, in cross section, a conventional multifilament textile fibre (15) in the initial state, i.e. not twisted; as is well known, such a fibre or "spun yarn" (or just "yarn") is formed from a plurality of elementary filaments (50), typically several tens to several hundreds thereof, of very fine diameter, generally less than 35 μm.

It will be recalled here simply that the textile plied yarns or cords, with at least a double twist (T1, T2), which is what is illustrated by way of example in FIGS. 2 and 3, are prepared from such a spun yarn by a method referred to as "twisting", in which:

during a first step (FIG. 2), each constituent spun yarn (15) of the final cord is first of all pre-twisted individually on itself (with an initial twist T1) in a given direction D1 (in the S or Z direction, respectively, according to recognized terminology denoting the orientation of the turns according to the transverse bar of an S or of a Z) to form a multifilament strand (or "ply"), also known as an overtwist (or "folded yarn") (20) in which the elementary filaments (50) find themselves deformed into a helix around the axis of the fibre (or axis of the strand);

then, during a second step (FIG. 3), the N strands or folded yarns, of which there are for example three (20a, 20b, 20c) in FIG. 3, are then twisted, this time all together, with a final twist T2 (that can be the same as or different from T1) in the opposite direction D2 (the Z or S direction, respectively), in order to obtain the final cord or plied yarn (30) with N strands.

The expression cord with at least a double twist (that is to say one manufactured on the basis of at least two successive twists T1, T2) is therefore immediately understood as meaning that at least two consecutive untwisting operations (or twisting in the opposite direction) are thus necessary in order to "deconstruct" the cord and "return" to the initial spun yarns of which it is made, i.e. to recover the starting multifilament fibres in their initial, not twisted state.

The purpose of the twisting is to adapt the properties of the material so as to create the transverse cohesion of the reinforcer, increase its fatigue performance and also improve adhesion with the reinforced matrix.

Figure 4:
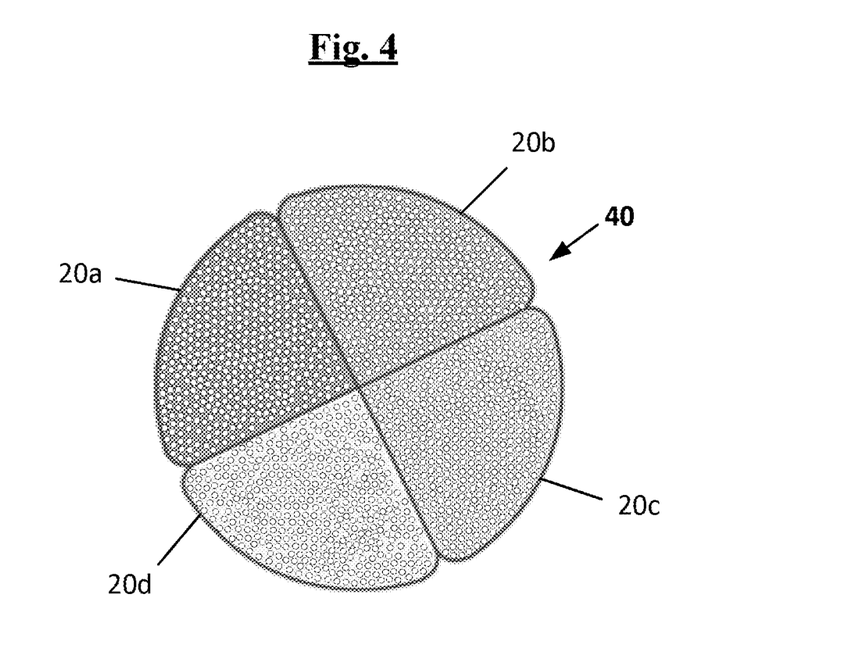

As a reminder, FIG. 4 shows, again in cross section, another depiction of a textile cord (40), less schematic than the previous depiction, serving as a reminder of the well-known fact that the section of a textile cord (made up in this case for example of 4 strands or folded yarns 20a, 20b, 20c, 20d), once formed and under minimum tension, actually comes closer to a cylindrical structure with a section with a substantially circular contour, on account of the high radial, lateral plasticity of the strands that is provided by the multifilament nature of the starting fibres (spun yarns).

As is well known to a person skilled in the art, the twists can be measured and expressed in different ways, either simply in terms of the number of twists per metre (t/m), or, and this is more rigorous when wishing to compare materials of different types (densities) and/or different counts, in terms of the helix angle ($\alpha$) of the filaments or, and this is equivalent, in terms of a twist factor K.

The helix angle $\alpha$ (with respect to the axis of the plied yarn) can be measured directly by visually observing the plied yarn, or its tangent (Tan) calculated in a known manner using the following equation, in which T represents the twist (in t/m) of the constituent elementary filaments of the plied yarn, and Re (in m) represents the radius of winding of the strands or folded yarns in the final plied yarn:

$$\text{Tan } \alpha = 2\pi T \, Re$$

The radius of winding Re is for its part deduced easily from the radius of the folded yarn, denoted Rs, depending on the specific design of the plied yarn; Re is, for example, equal to Rs in a plied-yarn design with two identical strands, and equal to $[(2/\sqrt{3}) \cdot Rs]$ in a plied-yarn design with three identical strands.

For its part, the radius Rs (expressed for example below in cm) of the folded yarn (similar to a cylinder) is deduced easily by calculating its count in tex (weight in grams of 1000 metres of folded yarns) and the density or mass per unit volume p of the material (in g/cm$^3$; in this case 1.14 g/cm$^3$ for nylon) using the following equation:

$$Ti = 10^5 \pi \rho Rs^2$$

The twist factor K is for its part linked to the twist T (T1 or T2 depending on whether the factor is calculated on a strand or on the plied yarn) according to the following well-known relationship (T in t/m, Ti in tex, $\rho$ in g/cm$^3$):

$$K = T[Ti/(1000 \cdot \rho)]^{1/2}$$

In accordance with the invention, the count Ti of each constituent strand or folded yarn of the plied yarn is greater than 180 tex. Preferably, Ti is greater than 200 tex, more preferably greater than 220 tex. Even more preferably, Ti is greater than 240 tex, in particular greater than 260 tex.

Depending on the requirements, the count Ti can of course be altered by prior grouping, most frequently in bundles of 2, 3 or 4, of several spun yarns of lower elementary count. For example, it is common to prepare a strand or folded yarn of 188 tex by grouping, before any twisting operation, 2 spun yarns with an elementary count of 94 tex; a strand or folded yarn of 280 tex can be prepared by grouping 2 spun yarns with an elementary count of 140 tex. In all instances, the count Ti indicated in the present application is always that of the final spun yarn (following any grouping) that serves as a strand for the first twisting (pre-twisting) operation in the manufacture of the plied yarn.

According to another essential feature, the tenacity (as a reminder, the breaking strength divided by the count) denoted $Te_1$ of each strand is greater than 75 cN/tex. Preferably, it is greater than 80 cN/tex, more preferably greater than 85 cN/tex. In particular, it is greater than 90 cN/tex, more particularly greater than 95 cN/tex.

According to another essential feature, the elongation at break $Ar_1$ of each strand is greater than 14%. Preferably, $Ar_1$ is greater than 16%, more preferably greater than 18%, in particular greater than 20%.

Examples of possibly suitable commercial nylon fibres that may be cited are for example the fibres "T728" or "T802" from the company Kordsa, "T654" from the company Nexis, or "T7" from the company Asahi, which can be available in different counts.

According to another essential feature of the invention, the tenacity $Te_2$ of the plied yarn is greater than 60 cN/tex, preferably greater than 65 cN/tex, even more preferably greater than 70 cN/tex. In particular, it is greater than 75 cN/tex, more particularly greater than 80 cN/tex.

According to another essential feature, the elongation at break $Ar_2$ of each plied yarn is greater than 18%. $Ar_2$ is preferably greater than 20%, more preferably greater than 22%, in particular greater than 24%.

According to another essential feature, the helix angle $\alpha$ of each plied yarn is greater than 20°; preferably, $\alpha$ is greater than 22°, more preferably greater than 24°.

Preferably, the torsion factor (denoted Ks) of each strand or folded yarn, which is thus calculated on the folded yarn as is present (twisted) in the plied yarn, is greater than 90, more preferably greater than 100, in particular greater than 110.

All the mechanical properties indicated above are measured on sized textile cords (i.e. ones that are ready to use, or that have been extracted from the rubber article that they reinforce) that have been subjected to a pre-conditioning; the term "pre-conditioning" is understood to mean the storage of the cords for at least 24 hours, before measurement, in a standard atmosphere according to the DIN EN 20139 European standard (temperature of 20±2° C.; hygrometry of 65%±2%).

The count of the elementary strands or of the cords is determined on at least three samples, each corresponding to a length of 50 m, by weighing this length. As a reminder, the count (or linear density) is the weight in grams of 1000 m of product, and is expressed in tex (0.111 tex is equivalent to 1 denier).

The mechanical properties in tension (breaking strength, tenacity and elongation at break) are measured in a known manner using an "INSTRON" tensile test machine fitted with type "4D" grips (for a breaking strength less than 100 daN) or type "4E" grips (for a breaking strength at least equal to 100 daN), unless indicated otherwise according to the ASTM D885 (2010) standard. The samples tested are subjected to a tensile stress over an initial length of 400 mm for the 4D grips and 800 mm for the 4E grips at a nominal speed of 200 mm/min, under a standard pretension of 0.5 cN/tex. All the results given are an average over 10 measurements.

A person skilled in the art will of course understand that the mechanical properties indicated for the plied yarns ($Te_2$, $Ar_2$) are those measured on plied yarns in their given (stable) twisted state (at a helix angle α), while the mechanical properties (Ti, $Te_1$, $Ar_1$) indicated for the multifilament strands are those measured on the constituent spun yarns of the strands once, firstly, the plied yarns and then, secondly, the strands themselves have been untwisted; reconstituted in this way after untwisting of the plied yarn, the spun yarns are then simply subjected, in a well-known manner, to very weak pre-twisting referred to as "protective twisting" (corresponding to a helix angle of the filaments of around 6 degrees) before they are positioned and subjected to the tensile test in the grips.

The rubber compositions used as matrices in the carcass reinforcement plies of the aircraft tyres according to the invention are conventional compositions for calendering textile reinforcers, typically based on at least one rubber, a reinforcing filler, such as carbon black and/or silica, generally a vulcanization system and conventional additives.

In order to adhere the nylon cords to their rubber matrix, use could be made of any appropriate adhesive system, for example a textile glue of the "RFL" (resorcinol-formaldehyde-latex) type or any known equivalent glue for conferring satisfactory adhesion between rubber and nylon, for example the most recent adhesive compositions described in the applications WO 2013/017421, WO 2013/017422, WO 2013/017423, WO 2015/007641, WO 2015/007642.

Preferably, the rubber is a diene rubber, that is to say, as will be recalled, any elastomer (single elastomer or blend of elastomers) which is derived, at least in part (i.e. a homopolymer or a copolymer), from diene monomers, that is to say monomers which bear two carbon-carbon double bonds, whether these are conjugated or not.

This diene elastomer is more preferably selected from the group consisting of polybutadienes (BR), natural rubber (NR), synthetic polyisoprenes (IR), butadiene copolymers, isoprene copolymers and blends of these elastomers, such copolymers being notably selected from the group consisting of butadiene-styrene copolymers (SBR), isoprene-butadiene copolymers (BIR), isoprene-styrene copolymers (SIR) and isoprene-butadiene-styrene copolymers (SBIR).

One particularly preferred embodiment consists in using an "isoprene" elastomer, that is to say an isoprene homopolymer or copolymer, in other words a diene elastomer selected from the group consisting of natural rubber (NR), synthetic polyisoprenes (IRs), various isoprene copolymers and mixtures of these elastomers. The isoprene elastomer is more preferably natural rubber or a synthetic polyisoprene of the cis-1,4 type. Among these synthetic polyisoprenes, use is made in particular of polyisoprenes having a content (mol %) of cis-1,4-bonds of greater than 90%, more preferably still of greater than 98%. According to one particularly preferred embodiment, each layer of rubber composition contains 50 to 100 phr of natural rubber.

Each rubber composition may contain a single or several diene elastomer(s), and also all or some of the additives usually employed in the rubber matrices intended for the manufacture of tyres, such as, for example, reinforcing fillers such as carbon black or silica, coupling agents, anti-ageing agents, antioxidants, plasticizers or extension oils, whether the latter are aromatic or non-aromatic in nature (notably oils that are very slightly aromatic, if at all, for example of the naphthene or paraffin type, with high or preferably low viscosity, MES or TDAE oils), plasticizing resins with a high glass transition temperature (higher than 30° C.), agents that improve the processability of the compositions in the raw state, tackifying resins, anti-reversion agents, methylene acceptors and donors such as HMT (hexamethylenetetramine) or H3M (hexamethoxymethylmelamine) for example, reinforcing resins (such as resorcinol or bismaleimide), adhesion promoter systems, a crosslinking or vulcanization system.

Preferably, the system for crosslinking the rubber composition is a system referred to as a vulcanization system, that is to say one based on sulfur (or on a sulfur donor agent) and a primary vulcanization accelerator. Various known secondary vulcanization accelerators or vulcanization activators may be added to this basic vulcanization system. Sulfur is used at a preferred content of between 0.5 and 10 phr, and the primary vulcanization accelerator, for example a sulfenamide, is used at a preferred content of between 0.5 and 10 phr. The content of reinforcing filler, for example of carbon black and/or silica, is preferably higher than 30 phr, notably between 30 and 100 phr.

All carbon blacks, especially blacks of the HAF, ISAF or SAF type, conventionally used in tyres ("tyre-grade" blacks) are suitable as carbon blacks. Mention will more particularly be made, among the latter, of the carbon blacks of 300, 600 or 700 (ASTM) grade (for example, N326, N330, N347, N375, N683 or N772). Precipitated or fumed silicas having a BET surface area of less than 450 $m^2/g$, preferably from 30 to 400 $m^2/g$, are notably suitable as silicas.

Preferably, each rubber composition has, in the crosslinked state, a secant tensile modulus, denoted ms, at 10% elongation, which is between 4 and 25 MPa, more preferably between 4 and 20 MPa; values notably between 5 and 15 MPa have proved to be particularly suitable. Measurements of this secant modulus are made under tension, unless otherwise indicated, in accordance with the ASTM D 412 standard of 1998 (test specimen "C"): the "true" secant modulus (that is to say the one with respect to the actual cross section of the test specimen) is measured in second elongation (that is to say after an accommodation cycle) at 10% elongation, denoted here by Ms and expressed in MPa (under standard temperature and relative humidity conditions in accordance with the ASTM D 1349 standard of 1999).

A further preferred feature of the tyre according to the invention is that the density of the radial textile plied yarns reinforcing said (at least one) radial carcass ply, measured in the axial direction Y, is between 50 and 80 threads/dm of ply (per decimetre, i.e. per 100 mm of width of rubber ply), preferably 60 to 75 threads/dm of ply.

As is known, the use of an aircraft tyre is characterized by conditions of particularly high pressure, load and speed.

In the present application, an "aircraft tyre" is preferably understood as being a tyre with a nominal pressure greater than 9 bar at a nominal deflection greater than 30%.

As a reminder, the nominal pressure is the nominal inflation pressure of the tyre as defined, for example, by the Tire and Rim Association (or TRA) standard.

The nominal deflection is the radial deformation of a tyre, or variation in radial height, when the latter passes from an unladen inflated state to a statically laden inflated state, under nominal pressure and load conditions as defined, for example, by the TRA standard. It is expressed in the form of a relative deflection, defined by the ratio of this variation in radial height of the tyre to half the difference between the outside diameter of the tyre and the maximum diameter of the rim measured on the rim flange. The outside diameter of the tyre is measured under static conditions in an unladen state inflated to the nominal pressure. The TRA standard defines in particular the squashing of an aircraft tyre by its squashed radius, that is to say by the distance between the axis of the wheel of the tyre and the plane of the ground with which the tyre is in contact under nominal pressure and load conditions.

In the tyre according to the invention, the radial carcass reinforcement (7) preferably comprises a plurality of radially superposed carcass plies, the number of superposed carcass plies being more preferably in a range from 3 to 10.

The particularity of the cord or plied yarn of nylon used in the carcass reinforcement of the aircraft tyre according to the invention, compared with the plied yarns used hitherto in the carcass reinforcements of prior art aircraft tyres, is that it combines the essential features listed above, namely:

it is made up of at least three strands;
the (elementary) count of each strand is very high, greater than 180 tex; its tenacity is greater than 75 cN/tex; its elongation at break is greater than 14%;
the tenacity of each plied yarn is greater than 60 cN/tex, its elongation at break is greater than 18%; its helix angle $\alpha$ is greater than 20°.

It should be noted that a design having three strands (or more), for elementary strand counts that are also high (greater than 180 tex), was in fact contrary to what a person skilled in the art knows and how they would proceed.

Specifically, knowing that very high breaking strengths and fatigue strengths of the plied yarns are necessary for the carcass reinforcement of an aircraft tyre, that any improvement in this fatigue strength mainly requires an increase in twisting (helix angle) of the plied yarn, inevitably accompanied by a worsening of the breaking strength, a person skilled in the art would tend to increase the elementary counts of the strands without increasing the number thereof. Moreover, an increase in the number of constituent strands of the plied yarn, not including the fact that it is more costly, involving greater design complexity of said plied yarn, is accompanied by the expected risk of the occurrence of defects that are potentially detrimental to the overall endurance of the reinforcer.

Moreover, limiting the number of strands to two (i.e. to the minimum) clearly appears to have been precisely the choice made in the prior art documents cited at the beginning of the present document, which all describe, for a reinforcing application for the radial carcass reinforcement of an aircraft tyre, cord designs with only 2 strands (N equal to 2) each time that the elementary count of the strands was particularly high, greater than 180 tex.

In point of fact, as will be described in detail in the following tests, tests carried out by the Applicants have demonstrated an unexpected result that runs counter to this preconception.

For the purposes of these tests, six different cords, all made of nylon 6-6, were manufactured from a single starting fibre ($Te_1$ equal to around 90 cN/tex and $Ar_1$ equal to around 20%) having two different counts, one 188 tex and the other 280 tex.

In order for it to be possible to conduct comparative tests with an identical overall count (around 560 tex), the spun yarns of 280 tex were thus assembled with two strands (N equal to 2), and those of 188 tex were assembled with three strands (N equal to 3). For each of these two variants of initial count Ti per strand, three different cords were manufactured with the helix angle (calculated according to the equation given above) being varied with three increasing values, of 23.5° to 28° (twist T2 varying from around 245 t/m to 320 t/m according to the circumstances).

The six nylon cords, denoted C1 to C6 in the following table, were all characterized by a double twist construction; they were manufactured in a conventional manner by assembling 2 or 3 strands (N equal to 2 or 3) depending on the final twist T2 and the direction D2 (S direction). Each of these strands had been manufactured beforehand by an initial operation of twisting (T1 equal to T2) the spun yarn on itself in the opposite direction D1 (Z direction).

Next, the fatigue strength of these cords was analysed by subjecting them to laboratory tests well known to a person skilled in the art, a test referred to as the "belt" test, sometimes known as the "shoe shine test", and a test referred to as the "disc fatigue test" (see for example EP 848 767, U.S. Pat. Nos. 2,595,069, 4,902,774, ASTM D885-591, revised 67T, standard), tests in which the textile cords, previously sized, are incorporated into a rubber article, which is vulcanized.

The principle of the "belt" test, first of all, is as follows: the belt comprises two layers of the cord to be tested, in a known rubber compound (composition) of the type of those commonly used for reinforcing tyres. The axis of each cord is oriented in the longitudinal direction of the belt and the cords are separated from the faces of the latter by a thickness of rubber of around 1 mm.

Next, this belt is subjected to the following stress loadings: the belt is driven cyclically, with the aid of a rod-crank system, around a wheel of given diameter (in this case 15 mm), such that each elementary portion of the belt is subjected to a given tension (in this case, around 15 daN) and undergoes cycles of variation in curvature which cause it to flex from an infinite radius of curvature to a given radius of curvature, specifically for 190 000 cycles at a frequency of 7 Hz. This variation in curvature of the belt causes the cord of the inner layer, closest to the wheel, to experience a given geometric compression ratio (in this case, around 13%) depending on the chosen wheel diameter. At the end of these stress loadings, the cords are stripped from the inner layer and the decline (denoted $\Delta FR$) in breaking strength of the cords once fatigued is measured.

The "disc fatigue test" for its part consists essentially in incorporating the cords to be tested in blocks of rubber and then, after curing, in fatiguing the test specimens of rubber thus formed in compression, between two rotating discs that are inclined with respect to one another (in this case, 3.5° or around 28% of the maximum compression ratio between the two discs) for a very high number of cycles (in the following examples, 600 000 cycles at 33 cycles/s). Following fatigue-loading, the cords are extracted from the test specimens; their residual breaking strength is measured and the decline (ΔFR) in the breaking strength is deduced therefrom.

The results obtained for the two types of test are detailed in the following table; also indicated is the initial breaking strength (FR) of the plied yarn, that is to say before fatigue-loading (expressed in absolute units and in relative values with the base 100 retained for the smallest helix angle, 23.5°).

TABLE

| Cord ref. | Ti spun yarn (tex) | N | Helix angle (α) | Breaking strength FR (daN) | | ΔFR "Disc Fatigue Test" | ΔFR "Shoe Shine Test" |
|---|---|---|---|---|---|---|---|
| C1 | 280 | 2 | 23.5° | 48.0 | 100 | −29% | −90% |
| C2 | 280 | 2 | 25.5° | 46.5 | 98 | −22% | −40% |
| C3 | 280 | 2 | 28.0° | 45.5 | 96 | −15% | −17% |
| C4 | 188 | 3 | 23.5° | 48.5 | 100 | −12% | −32% |
| C5 | 188 | 3 | 25.5° | 45.0 | 93 | −7% | −11% |
| C6 | 188 | 3 | 28.0° | 40.0 | 82 | −3% | −2% |

On studying this table in detail, it will first of all be noted that the increase in twist (helix angle up to 28°) results in a much more rapid reduction in the breaking strength in the case of the more complex design with three strands: −18% for the three-strand plied yarn (N=3), compared with only −4% for the two-strand plied yarn (N=2).

Such a result was expected by a person skilled in the art, who, precisely for this reason of more rapid worsening of the breaking strength, was not inclined in any way to depart from the two-strand design for elementary counts that high (greater than 180 tex).

However, quite unexpectedly, it has been found that passing from the two-strand design (N=2) to the three-strand design (N=3), regardless of the type of fatigue test, is accompanied by a very significant improvement in endurance (reduced ΔFR), very particularly as regards the endurance in bending/compression (shoe shine test) that is essential as we have highlighted for reinforcing an aircraft tyre carcass reinforcement: where the two-strand cords (C3, C2 and C1, respectively) lose 17%, 40% and 90%, respectively, of their initial breaking strength following fatigue-loading, at the twist in question, the three-strand cords (C6, C5 and C4, respectively) only lose 2%, 11% and 32%, respectively, of their initial breaking strength at the same levels of twist.

In conclusion, it should therefore be inferred therefrom that, for the same overall plied yarn count and the same twist (same helix angle), the three-strand design of high count, in spite of the greater loss of breaking strength, ultimately proves to be much more advantageous in an aircraft tyre carcass reinforcement, where very good fatigue in bending/compression is targeted.

By virtue of the invention, it is thus possible to further improve the endurance of radial carcass reinforcements for aircraft, and thus to increase the service life of the tyres or alternatively, with a given service life, to reduce the weight of these reinforcements and tyres by reducing the total number of plies present in these carcass reinforcements.

The invention claimed is:

1. A radial aircraft tire, defined in circumferential, axial, and radial directions, said tire comprising a crown surmounted by a tread, two sidewalls, two beads, each sidewall connecting each bead to the crown, a carcass reinforcement that is anchored in each of the beads at at least one bead wire and extends in the sidewalls as far as the crown, a crown reinforcement that extends in the crown in the circumferential direction and is situated radially between the carcass reinforcement and the tread,
   wherein the carcass reinforcement is a radial carcass reinforcement having from 3 to 10 radially superposed carcass plies in the form of a rubber matrix reinforced with radially oriented reinforcing elements being constituted entirely or partially by textile plied yarns of nylon comprising N multifilament strands twisted together to form a helix,
   wherein N is greater than 2,
   wherein a count denoted Ti of each strand is greater than 180 tex,
   wherein a tenacity denoted $Te_1$ of each strand is greater than 75 cN/tex,
   wherein an elongation at break denoted $Ar_1$ of each strand is greater than 14%,
   wherein a tenacity denoted $Te_2$ of each plied yarn is greater than 60 cN/tex,
   wherein an elongation at break denoted $Ar_2$ of each plied yarn is greater than 18%,
   wherein a helix angle denoted α of each plied yarn is from 22° to 28°,
   wherein each strand is twisted individually on itself with a first twist denoted T1 in a first direction denoted D1,
   wherein the plied yarn is twisted with a second twist denoted T2 in a direction opposite to D1 denoted D2,
   wherein T2 is from 245 t/m to 320 t/m, and
   wherein the tire is an aircraft tire having a nominal pressure of greater than 9 bar at a nominal deflection greater than 30%.

2. The radial aircraft tire according to claim 1, wherein N is equal to 3 or 4.

3. The radial aircraft tire according to claim 2, wherein N is equal to 3.

4. The radial aircraft tire according to claim 1, wherein T1 is greater than 200 tex.

5. The radial aircraft tire according to claim 4, wherein T1 is greater than 220 tex.

6. The radial aircraft tire according to claim 5, wherein T1 is greater than 240 tex.

7. The radial aircraft tire according to claim 6, wherein T1 is greater than 260 tex.

8. The radial aircraft tire according to claim 1, wherein $Te_1$ is greater than 80 cN/tex.

9. The radial aircraft tire according to claim 8, wherein $Te_1$ is greater than 85 cN/tex.

10. The radial aircraft tire according to claim 9, wherein $Te_1$ is greater than 90 cN/tex.

11. The radial aircraft tire according to claim 10, wherein $Te_1$ is greater than 95 cN/tex.

12. The radial aircraft tire according to claim 1, wherein $Ar_1$ is greater than 16%.

13. The radial aircraft tire according to claim 12, wherein Ar1 is greater than 18%.

14. The radial aircraft tire according to claim 1, wherein the nylon is a nylon 6 or 6-6.

15. The radial aircraft tire according to claim 14, wherein the nylon is a nylon 6-6.

16. The radial aircraft tire according to claim 1, wherein $Te_2$ is greater than 65 cN/tex.

17. The radial aircraft tire according to claim 16, wherein $Te_2$ is greater than 70 cN/tex.

18. The radial aircraft tire according to claim 17, wherein $Te_2$ is greater than 75 cN/tex.

19. The radial aircraft tire according to claim 18, wherein $Te_2$ is greater than 80 cN/tex.

20. The radial aircraft tire according to claim 1, wherein $Ar_2$ is greater than 20%.

21. The radial aircraft tire according to claim 20, wherein $Ar_2$ is greater than 22%.

22. The radial aircraft tire according to claim 1, wherein the helix angle α of each plied yarn is from 24° to 28°.

23. The radial aircraft tire according to claim 1, wherein the twist factor of each strand, in the plied yarn, is greater than 90.

24. The radial aircraft tire according to claim 23, wherein the twist factor of each strand, in the plied yarn, is greater than 100.

25. The radial aircraft tire according to claim 1, wherein the density of textile plied yarns reinforcing the carcass ply, in the axial direction, is between 50 and 80 threads/dm of ply.

26. The radial aircraft tire according to claim 25, wherein the density of textile plied yarns reinforcing the carcass ply, in the axial direction, is between 60 to 75 threads/dm of ply.

27. The radial aircraft tire according to claim 1, wherein the rubber matrix of the carcass ply has, in the crosslinked state, a secant tensile modulus at 10% elongation of between 4 and 25 MPa.

28. The radial aircraft tire according to claim 27, wherein the rubber matrix of the carcass ply has, in the crosslinked state, a secant tensile modulus at 10% elongation of between 4 and 20 MPa.

\* \* \* \* \*